United States Patent
Miura (10) Patent No.: US 10,735,609 B2
(45) Date of Patent: Aug. 4, 2020

(54) PRINTING APPARATUS, PRINTING CONTROL APPARATUS, AND CONTROL METHOD

(71) Applicant: SEIKO EPSON CORPORATION, Tokyo (JP)

(72) Inventor: Shin Miura, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/042,072

(22) Filed: Jul. 23, 2018

(65) Prior Publication Data
US 2019/0037090 A1    Jan. 31, 2019

(30) Foreign Application Priority Data
Jul. 25, 2017 (JP) ................. 2017-143297
Jul. 27, 2017 (JP) ................. 2017-145196

(51) Int. Cl.
*H04N 1/04* (2006.01)
*H04N 1/00* (2006.01)

(52) U.S. Cl.
CPC ..... *H04N 1/00689* (2013.01); *H04N 1/00037* (2013.01); *H04N 1/00692* (2013.01); *H04N 1/00694* (2013.01); *H04N 1/00724* (2013.01); *H04N 1/00708* (2013.01)

(58) Field of Classification Search
CPC ........... H04N 1/00689; H04N 1/00037; H04N 1/00692; H04N 1/00694; H04N 1/00724; H04N 1/00708
USPC ................. 358/1.1–1.18, 474, 498
See application file for complete search history.

(56) References Cited

U.S. PATENT DOCUMENTS

| | | | | |
|---|---|---|---|---|
| 2004/0141762 A1* | 7/2004 | Okamoto | ........... | G03G 15/6508 399/23 |
| 2005/0225020 A1* | 10/2005 | Fukatsu | ............... | B65H 39/042 270/18 |
| 2006/0274331 A1* | 12/2006 | Kawasaki | ............. | G06F 3/1213 358/1.1 |
| 2010/0165398 A1* | 7/2010 | Watanabe | ............ | H04N 1/2307 358/1.15 |
| 2013/0002750 A1* | 1/2013 | Takenouchi | .............. | B41J 29/38 347/16 |
| 2013/0201520 A1* | 8/2013 | Sato | ........................ | G06K 15/02 358/1.15 |

FOREIGN PATENT DOCUMENTS

JP    2014-133328 A    7/2014

* cited by examiner

*Primary Examiner* — Gabriel I Garcia
(74) *Attorney, Agent, or Firm* — Workman Nydegger (57) ABSTRACT

A printing apparatus having an insert-sheet inserting function includes a plurality of sheet-feeding ports, a printing mechanism that performs printing on paper fed from each sheet-feeding port, and a controller that controls the printing mechanism. In a case where no insert-sheets are present in a sheet-feeding port for insert-sheets when the printing mechanism feeds the insert-sheets from the sheet-feeding port for insert-sheets, the controller selects another sheet-feeding port different from the sheet-feeding port for insert-sheets as a new sheet-feeding port for insert-sheets on the basis of a paper specification of paper used for printing data to be printed and a sheet-feeding port setting.

19 Claims, 5 Drawing Sheets

PRINTING APPARATUS, PRINTING CONTROL APPARATUS, AND CONTROL METHOD

BACKGROUND

1. Technical Field

The present invention relates to a printing apparatus and the like that have a function of inserting insert-sheets, and more particularly, to a printing apparatus and the like capable of improving user-friendliness, for example, in a case where no insert-sheets are present.

2. Related Art

Printing apparatuses having a function of inserting insert-sheets between print jobs or the like are prevailing.

Considering that it is inconvenient when insert-sheets cannot be inserted between different jobs by the same user, JP-A-2014-133328 states that in a case where a specific condition is satisfied, the insert-sheets are inserted between different jobs by the same user.

In a case where no insert-sheets are present in the middle of printing using the function of inserting the insert-sheets, or in a case where the user specifies a sheet-feeding port for feeding the insert-sheets, more user-friendly control is desired.

SUMMARY

An advantage of some aspects of the invention is to provide a printing apparatus and the like that have a function of inserting insert-sheets and that are capable of improving user-friendliness, for example, in a case where no insert-sheets are present.

According to an aspect of the invention, a printing apparatus having an insert-sheet inserting function includes a plurality of sheet-feeding ports, a printing mechanism that performs printing on paper fed from each sheet-feeding port, and a controller that controls the printing mechanism. In a case where no insert-sheets are present in a sheet-feeding port for insert-sheets when the printing mechanism feeds the insert-sheets from the sheet-feeding port for insert-sheets, the controller selects another sheet-feeding port different from the sheet-feeding port for insert-sheets as a new sheet-feeding port for insert-sheets on the basis of a paper specification of paper used for printing data to be printed and a sheet-feeding port setting.

Further, it is preferable that each sheet-feeding port be set to correspond to a sheet size, and the controller preferentially select, over the other sheet-feeding ports, a sheet-feeding port corresponding to a sheet size of paper used for printing data to be printed as a new sheet-feeding port for insert-sheets.

Further, it is preferable that each sheet-feeding port be set to correspond to a sheet size and a sheet-feeding direction, and that the controller preferentially select, over the other sheet-feeding ports, a sheet-feeding port corresponding to a sheet size and a sheet-feeding direction of paper used for printing data to be printed as a new sheet-feeding port for insert-sheets.

Further, it is preferable that the controller determine whether a sheet-feeding port corresponding to a sheet size and a sheet-feeding direction of paper used for printing data to be printed be present, and in a case where the controller determines that the corresponding sheet-feeding port is present, the controller preferentially select, over the other sheet-feeding ports, the corresponding sheet-feeding port as a new sheet-feeding port for insert-sheets, and in a case where the controller determines that the corresponding sheet-feeding port is not present, the controller preferentially select, over the other sheet-feeding ports, another sheet-feeding port corresponding to a sheet size of paper used for printing data to be printed as a new sheet-feeding port for insert-sheets.

Further, it is preferable that each sheet-feeding port be set to correspond to a paper property, and in a case where a paper property of insert-sheets which are used up in a sheet-feeding port for insert-sheets is colored paper, the controller preferentially select, over the other sheet-feeding ports, another sheet-feeding port corresponding to the colored paper as a new sheet-feeding port for insert-sheets.

Further, it is preferable that each sheet-feeding port be set to correspond to information indicating whether each sheet-feeding port is a target for sheet-feeding-port automatic selection, and in a case where the sheet-feeding-port automatic selection is set in a print job, the controller preferentially select, over the other sheet-feeding ports, a sheet-feeding port which is the target for the sheet-feeding-port automatic selection as a new sheet-feeding port for insert-sheets.

Further, it is preferable that each sheet-feeding port be set to correspond to a paper property, and that the controller preferentially select, over the other sheet-feeding ports, a sheet-feeding port corresponding to regular paper or recycled paper as a new sheet-feeding port for insert-sheets.

Further, it is preferable that in a case where paper used for printing data to be printed is OHP paper, the controller preferentially select, over the other sheet-feeding ports, a sheet-feeding port corresponding to the regular paper or the recycled paper as a new sheet-feeding port for insert-sheets.

Further, it is preferable that each sheet-feeding port be set to correspond to a sheet size, and in a case where paper used for printing data to be printed is OHP paper, the controller determine whether a sheet-feeding port corresponding to a sheet size of the OHP paper is present, and in a case where the controller determines that the corresponding sheet-feeding port is present, the controller preferentially select, over the other sheet-feeding ports, the corresponding sheet-feeding port as a new sheet-feeding port for insert-sheets, and in a case where the controller determines that the corresponding sheet-feeding port is not present, the controller determine whether a sheet-feeding port corresponding to a sheet size larger than the sheet size of the OHP paper is present, and in a case where the controller determines that the sheet-feeding port corresponding to the sheet size larger than the sheet size of the OHP paper is present, the controller preferentially select, over the other sheet-feeding ports, the sheet-feeding port corresponding to the sheet size larger than the sheet size of the OHP paper as a new sheet-feeding port for insert-sheets.

Further, it is preferable that in a case where paper used for printing data to be printed is OHP paper, the controller select a new sheet-feeding port for insert-sheets on the basis of a rule different from a rule for selecting a sheet-feeding port for insert-sheets when paper used for printing data to be printed is paper other than the OHP paper.

According to another aspect of the invention, a printing control apparatus controls a printing apparatus including a plurality of sheet-feeding ports and having an insert-sheet inserting function. The printing control apparatus controls selection of a sheet-feeding port for insert-sheets on a print setting screen on the basis of a paper specification of paper used for printing data to be printed, where the paper specification is set on the print setting screen corresponding to the printing apparatus.

Further, it is preferable that the printing control apparatus control the selection of the sheet-feeding port for insert-sheets on the print setting screen so that a sheet-feeding port for feeding paper with a sheet size set on the print setting screen, where the sheet size is different from a sheet size of paper used for printing data to be printed, is not selected as the sheet-feeding port for insert-sheets.

Further, it is preferable that the printing control apparatus control the selection of the sheet-feeding port for insert-sheets on the print setting screen so that a sheet-feeding port for feeding paper with a sheet-feeding direction set on the print setting screen, where the sheet-feeding direction is different from a sheet-feeding direction of paper used for printing data to be printed, is not selected as the sheet-feeding port for insert-sheets.

Further, it is preferable that in a case where a sheet size set on the print setting screen, where the sheet size is a sheet size of paper used for printing data to be printed, is different from a sheet size of paper to be fed from the sheet-feeding port for insert-sheets selected on the print setting screen, the printing control apparatus change the sheet-feeding port selected as a sheet-feeding port for insert-sheets to another sheet-feeding port for feeding paper with a sheet size set on the print setting screen, where the sheet size matches a sheet size of paper used for printing data to be printed.

Further, it is preferable that in a case where a sheet-feeding direction set on the print setting screen, where the sheet-feeding direction is a sheet-feeding direction of paper used for printing data to be printed, is different from a sheet-feeding direction of paper to be fed from the sheet-feeding port for insert-sheets selected on the print setting screen, the printing control apparatus change the sheet-feeding port selected as a sheet-feeding port for insert-sheets to another sheet-feeding port for feeding paper with a sheet size set on the print setting screen, where the paper has a sheet-feeding direction matching a sheet-feeding direction of paper used for printing data to be printed.

Further, it is preferable that in a case where a sheet size set on the print setting screen, where the sheet size is a sheet size of paper used for printing data to be printed, is different from a sheet size of paper to be fed from the sheet-feeding port for insert-sheets selected on the print setting screen, the printing control apparatus display a message stating that the sheet size of paper used for printing data to be printed and the sheet size of paper to be fed from the selected sheet-feeding port for insert-sheets do not match.

Further, it is preferable that in a case where a sheet-feeding direction set on the print setting screen, where the sheet-feeding direction is a sheet-feeding direction of paper used for printing data to be printed, is different from a sheet-feeding direction of paper to be fed from the sheet-feeding port for insert-sheets selected on the print setting screen, the printing control apparatus display a message stating that the sheet-feeding direction of paper used for printing data to be printed and the sheet-feeding direction of paper to be fed from the selected sheet-feeding port for insert-sheets do not match.

Further, it is preferable that in a case where a paper specification set on the print setting screen, where the paper specification is a paper specification of paper used for printing data to be printed, is different from a paper specification of paper to be fed from the sheet-feeding port for insert-sheets selected on the print setting screen, the printing control apparatus determine whether a sheet-feeding port setting displayed on the print setting screen is sheet-feeding-port automatic selection, and in a case where the printing control apparatus determines that the sheet-feeding port setting is the sheet-feeding-port automatic selection, the printing control apparatus change the paper specification of paper used for printing data to be printed to another paper specification matching the paper specification of paper to be fed from the selected sheet-feeding port for insert-sheets.

According to still another aspect of the invention, a control method for controlling a printing apparatus having an insert-sheet inserting function, where the printing apparatus includes a plurality of sheet-feeding ports, and a printing mechanism that performs printing on paper fed from each sheet-feeding port, includes in a case where no insert-sheets are present in a sheet-feeding port for insert-sheets when the printing mechanism is caused to feed the insert-sheets from the sheet-feeding port for insert-sheets, selecting another sheet-feeding port different from the sheet-feeding port for insert-sheets as a new sheet-feeding port for insert-sheets on the basis of a paper specification of paper used for printing data to be printed and a sheet-feeding port setting.

Further objects and features of the present invention will become apparent from the embodiments of the invention described below.

BRIEF DESCRIPTION OF THE DRAWINGS

The invention will be described with reference to the accompanying drawings, wherein like numbers reference like elements.

DESCRIPTION OF EXEMPLARY EMBODIMENTS

The embodiments of the invention will be described below with reference to the drawings. However, such embodiments place no limitation on the technological scope of the invention. Note that in the drawings, the same or similar components are denoted by the same reference numerals or reference symbols.

Figure 1:
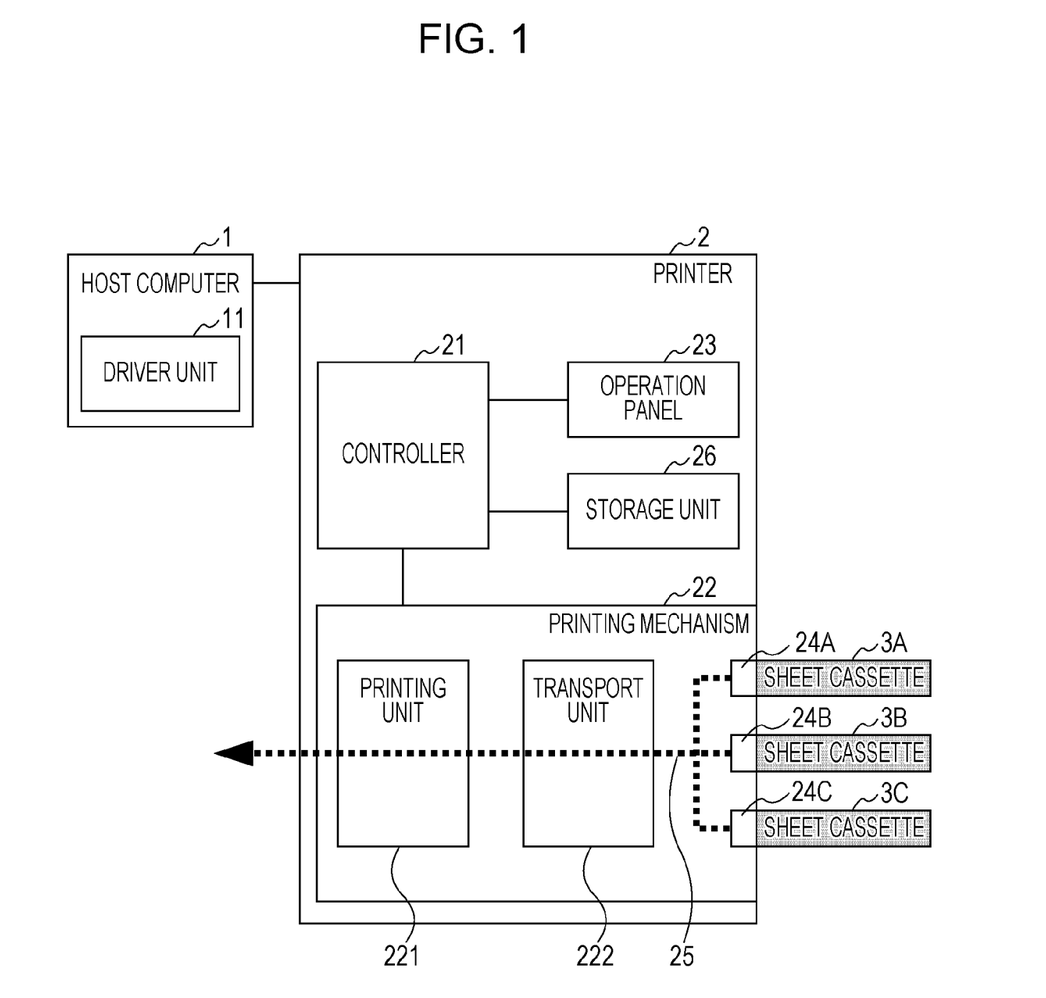
FIG. 1 is a schematic structural diagram of a printing apparatus according to an embodiment of the present invention.

FIG. 1 is a schematic structural diagram of a printing apparatus according to an embodiment of the present invention. A printer 2 illustrated in FIG. 1 is a printing apparatus to which the present invention is applied. The printer 2 has a function of inserting insert-sheets, and when no insert-sheets are present in the course of printing using this function, the printer 2 selects an alternative sheet-feeding port 24 for insert-sheets on the basis of the paper specification of paper used in the print job and the paper specification used for the insert-sheets. In addition, when a user sets the sheet-feeding port 24 for insert-sheets (sheet cassette 3 of a sheet feeder) in the host computer 1 or the printer 2, the selection of the sheet-feeding port 24 for insert-sheets is controlled on the basis of the paper specification set for the print job. Through this process, in a case where no insert-sheets are present, user-friendliness can be improved, for example, when the user sets the sheet-feeding port 24 for insert-sheets.

Note that the paper specification specifies a type of printing medium (paper) on which the printer 2 performs printing, and includes at least paper size (sheet size), sheet-feeding direction, and type of paper. In addition, the print job in this description means context to be printed (data to be printed) which is delimited by the insertion of insert-sheets.

As illustrated in FIG. 1, the printer 2 is, for example, an ink jet printer that performs printing on a sheet in accordance with a print request from a host device such as the host computer 1 or an operation of the printer 2. The printer 2 has a function of inserting insert-sheets during a print job.

The host computer 1 is communicably connected to the printer 2 and performs the print request to the printer 2 on the basis of a user operation or the like. The host computer 1 is a personal computer or the like and includes a CPU, a RAM, a ROM, an HDD, a display device, an operation device, a communication interface, and the like, which are not illustrated.

The host computer 1 includes a driver unit 11 as a functional component, as illustrated in FIG. 1. The driver unit 11 generates print data for the printer 2 on the basis of an instruction from an application (not illustrated) or the like that generates graphics and characters to be printed, and transmits the print data to the printer 2.

The driver section 11 (printing control apparatus) provides the content of a setting screen for setting print data as a user interface in which the print data includes various kinds of setting information regarding printing conditions and the like when printing. The content of the setting screen is displayed on a display unit of the host computer 1, and the user can input (select) the setting information on the basis of the content of the setting screen.

The setting information includes information relating to a print job and paper used as insert-sheets. Specifically, the setting information includes information on the sheet-feeding port, sheet size, sheet-feeding direction, and paper property. The sheet-feeding port is an item for specifying among a plurality of sheet-feeding ports 24 provided in the printer 2 which sheet-feeding port 24 is used. Sheet size is an item for specifying the size (A4, A3, etc.) of sheets to be used for printing. Sheet-feeding direction is an item for specifying the orientation of sheets (vertical or horizontal, in this case, the orientation is the same as the sheet discharge direction) at the time of feeding and discharging the sheets. Paper property is an item for specifying the type (regular paper, recycled paper, etc.) of a paper material.

Note that the sheet-feeding port can be set to "sheet-feeding-port automatic selection", and in a case where the sheet-feeding port is set to the sheet-feeding-port automatic selection, an appropriate sheet-feeding port 24 of printer 2 will be selected on the basis of the content of the setting of other items.

Note that the driver unit 11 includes a driver program for the printer 2, and a CPU, a RAM, and the like that operate according to the driver program.

As illustrated in FIG. 1, the printer 2 includes a controller 21, a printing mechanism 22, an operation panel 23, a sheet-feeding port 24, a transport path 25, a storage unit 26, and the like. The controller 21 is a controller for controlling each component of the printer 2 and includes, as a hardware configuration, a CPU, a RAM, a ROM, an NVRAM, and an ASIC (Application Specific Integrated Circuit), and the like.

Upon receiving the print request, such as when receiving print data from the host computer 1, the controller 21 (printing control apparatus) controls the printing mechanism 22 to print an image to be printed on a sheet according to the printing conditions corresponding to the content of the print job. The controller 21 selects (decides) an appropriate sheet-feeding port 24 on the basis of the setting content of the sheet-feeding port, the sheet size, the sheet-feeding direction, and the paper property as described above, and feeds sheets from the selected sheet-feeding port to perform printing.

In addition, as described above, upon receiving a print request including a request to insert insert-sheets, the printer 2 decides (selects) an alternative sheet-feeding port 24 for insert-sheets on the basis of the paper specification set for the print job and the paper specification set for insert-sheets in response to an error of the absence of insert-sheets. In addition, in a case where the user configures insert-sheet settings on the operation panel 23, the display and the setting are controlled on the basis of the paper specification set for the print job.

Note that the controller 21 executes the process by cooperatively operating a program instructing the process, a CPU operating in accordance with the program, and a ROM, a RAM, an NVRAM, and the like, which store the program.

The printing mechanism 22 performs printing on a sheet or the like (printing medium) in accordance with an instruction from the controller 21. As illustrated in FIG. 1, the printing mechanism 22 includes a printing unit 221, a transport unit 222, and the like. In addition, the printer 2 includes a plurality of sheet-feeding ports 24 and the transport path 25.

In the embodiment of the invention, three sheet-feeding ports 24 (24A, 24B, 24C), into which sheet cassettes 3 (3A, 3B, 3C) for storing various types of paper are respectively inserted, are provided. At the time of printing, paper fed from one of the sheet-feeding ports 24 and the fed sheet is transported along the transport path 25.

The transport unit 222 includes a transport roller, its driving source, its transmission device, and the like and transports paper fed from each sheet-feeding port 24 to a printing position and then transports and discharges the printed paper.

The printing unit 222 performs printing on the sheet transported to the printing position. In the embodiment of the invention, the printing unit 222 includes a print head having a plurality of nozzles that eject ink, a carriage that carries a print head and moves in the sub-scanning direction, and the like.

The operation panel 23 is a user interface of the printer 2 and includes a display monitor, operation buttons, and the like. Under the control of the controller 21, the operation panel 23 displays the setting screen for the user via the display monitor, and information set by the user who operates the operation button is input through the operation panel 23.

The storage unit 26 stores information associating each of the sheet-feeding ports 24A to 24C with at least one of the sheet size, the sheet-feeding direction, and the paper property. In addition, the storage unit 26 stores information indicating whether each of the sheet-feeding ports 24A to 24C is a target for sheet-feeding-port automatic selection. Note that the storage unit 26 includes a nonvolatile memory and the like. In addition, the user can operate the display device of the host computer 1 or the operation panel 23 of the printer 2 to associate the sheet size or the like with the sheet-feeding ports 24A to 24C. Note that the user may perform the above setting in advance before the start of printing. The setting timing is not limited to this and may be any timing.

In the host computer 1 and the printer 2 according to the embodiment of the invention having the above-described configuration, when a printing instruction to insert insert-sheets is made, first, the driver unit 11 generates print data including the above-described setting information to transmit the generated print data to the printer 2. The printer 2 interprets the generated print data and executes printing processing under the printing conditions corresponding to the setting information.

In such processing, the printer 2 has a feature of how to perform processing when no insert-sheets are present and when the user configures settings for the insert-sheets. Specific processing will be described below.

Figure 2A:
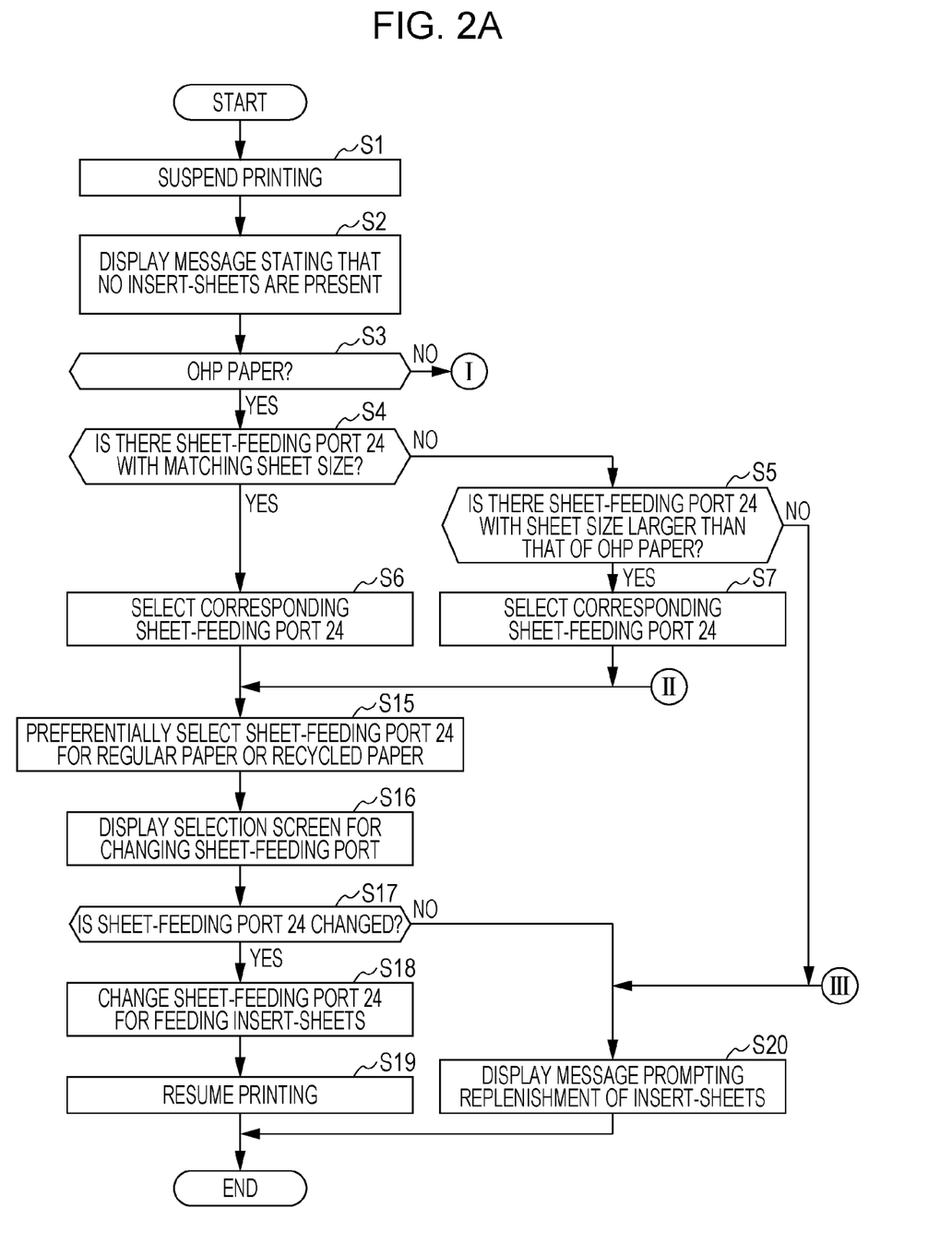
FIGS. 2A and 2B are flowcharts illustrating process steps when no insert-sheets are present.
Figure 2B:
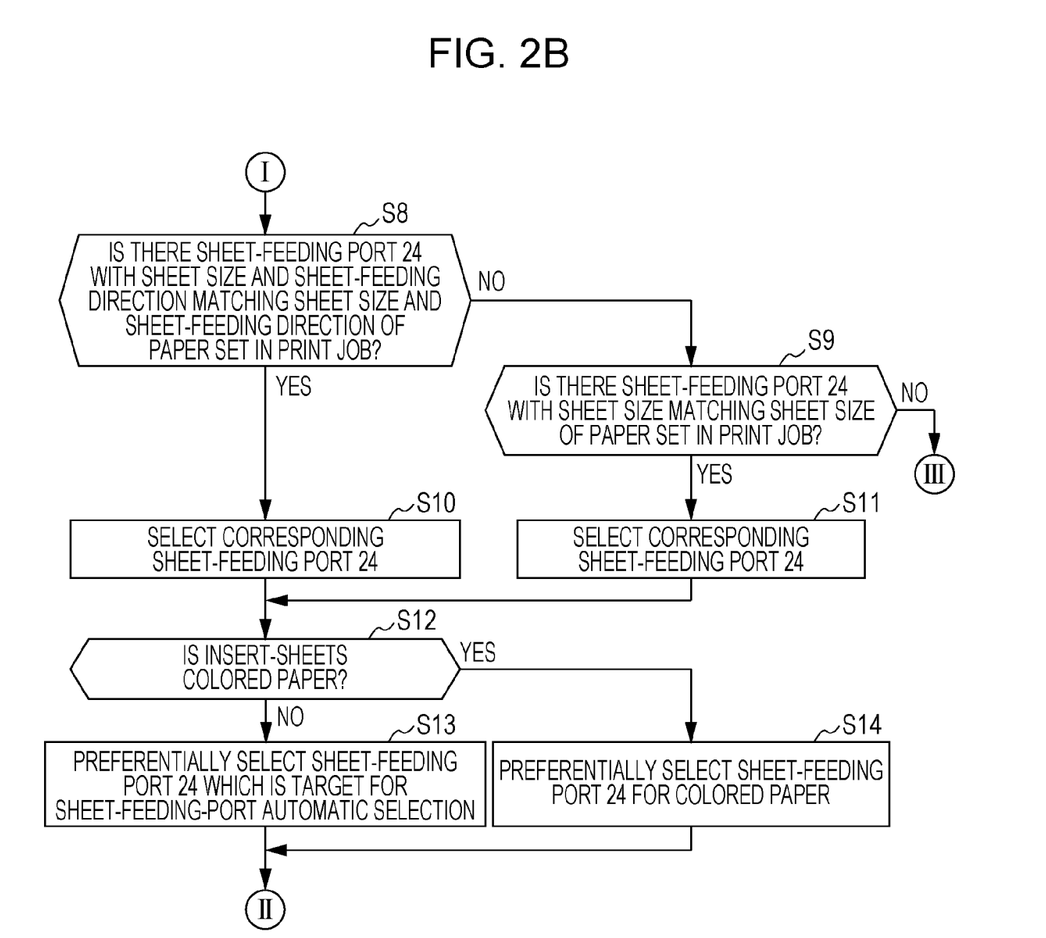

After the printer 2 receives print data including the function of inserting insert-sheets, a process for when no insert-sheets are present will be described. FIGS. 2A and 2B are flowcharts illustrating process steps for when no insert-sheets are present.

First, upon detecting that the absence of insert-sheets at the sheet-feeding port 24 has occurred, the controller 21 temporarily suspends the printing that is being performed (Step S1 in FIG. 2A). Then, the controller 21 displays on the operation panel 23 and on the display device of the host computer 1 a message stating that no insert-sheets are present (Step S2 in FIG. 2A).

Thereafter, the controller 21 executes a process for feeding the insert-sheets from the alternative sheet-feeding port 24. The controller 21 changes the content of the process depending on whether the print job being processed is performed using OHP paper.

In a case where the print job performs printing processing on the OHP paper ("Yes" in Step S3 in FIG. 2A), the controller 21 determines whether a sheet-feeding port 24 for feeding paper with a sheet size matching the sheet size of OHP paper (sheet size of the sheet used in the print job) is present (Step S4 in FIG. 2A).

As a result of the determination, in a case where it is determined that a sheet-feeding port 24 for feeding paper with the matching sheet size is present ("Yes" in Step S4 in FIG. 2A), the controller 21 selects the corresponding sheet-feeding port 24 (Step S6 in FIG. 2A). Thereafter, the process proceeds to Step S15.

In contrast, as a result of the determination, in a case where it is determined that no sheet-feeding ports 24 for feeding paper with the matching sheet size are present ("No" in Step S4 in FIG. 2A), the controller 21 determines whether a sheet-feeding port 24 for feeding paper with a sheet size larger than the sheet size of the OHP paper is present (Step S5 in FIG. 2A).

As a result of the determination, in a case where it is determined that a sheet-feeding port 24 for feeding paper with a sheet size larger than the sheet size of the OHP paper is present ("Yes" in Step S5 in FIG. 2A), the controller 21 selects the corresponding sheet-feeding port 24 (Step S7 in FIG. 2A). Thereafter, the process proceeds to Step S15. In contrast, in a case where it is determined that no sheet-feeding ports 24 for feeding paper with a sheet size larger than the sheet size of the OHP paper are present ("No" in Step S5 in FIG. 2A), the process proceeds to Step S20.

Returning to Step S3, in a case where the print job does not perform printing processing on the OHP paper ("No" in Step S3 in FIG. 2A), it is determined whether a sheet-feeding port 24 for feeding paper with a sheet size and a sheet-feeding direction matching the sheet size and the sheet-feeding direction of the sheet used in the print job is present (Step S8 in FIG. 2B).

As a result of the determination, in a case where it is determined that a sheet-feeding port 24 for feeding paper with the matching sheet size and the matching sheet-feeding direction is present ("Yes" in Step S8 in FIG. 2B), the controller 21 selects the corresponding sheet-feeding port 24 (Step S10 in FIG. 2B). Thereafter, the process proceeds to Step S12.

In contrast, as a result of the determination, in a case where it is determined that no sheet-feeding ports 24 for feeding paper with the matching sheet size and the matching sheet-feeding direction are present ("No" in Step S8 in FIG. 2B), the controller 21 determines whether a sheet-feeding port 24 for feeding paper with a sheet size matching the sheet size of paper used in the print job is present (Step S9 in FIG. 2B).

As a result of the determination, in a case where it is determined that a sheet-feeding port 24 for feeding paper with the matching sheet size is present ("Yes" in Step S9 in FIG. 2B), the controller 21 selects the corresponding sheet-feeding port 24 (Step S11 in FIG. 2B). Thereafter, the process proceeds to Step S12. In contrast, in a case where it is determined that no sheet-feeding ports 24 for feeding paper with the matching sheet size are present ("No" in Step S9 in FIG. 2B), the process proceeds to Step S20.

In Step S12, the controller 21 determines whether the insert-sheets that have been used are colored paper (Step S12 in FIG. 2B).

As a result of the determination, in a case where the insert-sheets are not colored paper ("No" in Step S12 in FIG. 2B), the controller 21 preferentially selects, among the sheet-feeding ports 24 which have been selected at this time, a sheet-feeding port 24 to be selected when the sheet-feeding port setting is set to "sheet-feeding-port automatic selection" (Step S13 in FIG. 2B). In a case where a plurality of such sheet-feeding ports 24 are present, the plurality of such sheet-feeding ports 24 are selected, and in a case where no such sheet-feeding ports 24 are present, there is no change in the selection in this process. Thereafter, the process proceeds to Step S15.

As a result of the determination, in a case where the insert-sheets are colored paper ("Yes" in Step S12 in FIG. 2B), the controller 21 preferentially selects a sheet-feeding port 24 for feeding colored paper among the sheet-feeding ports 24 which have been selected at this time (Step S14 in FIG. 2B). In a case where a plurality of such sheet-feeding ports 24 are present, the plurality of such sheet-feeding ports 24 are selected, and in a case where no such sheet-feeding ports 24 are present, there is no change in the selection in this process. Thereafter, the process proceeds to Step S15.

In Step S15, the controller 21 preferentially selects a sheet-feeding port 24 for feeding regular paper or recycled paper among the sheet-feeding ports 24 which have been selected at this time (Step S15 in FIG. 2A). In a case where a plurality of such sheet-feeding ports 24 are present, the plurality of such sheet-feeding ports 24 are selected, and in a case where no such sheet-feeding ports 24 are present, there is no change in the selection in this process.

Next, the controller 21 displays on the display panel 23 and the display device of the host computer 1 a screen for selecting whether to change the sheet-feeding port 24 for insert-sheets (Step S16 in FIG. 2A). It is preferable to display the content of the paper specification of paper fed from the sheet-feeding port 24 to be changed.

When the user performs a selection operation on the screen, and in the selection result, which is received from the host computer 1 or the operation panel 23, the sheet-feeding port 24 is changed ("Yes" in Step S17 in FIG. 2A), the controller 21 changes the sheet-feeding port 24 for feeding insert-sheets to another sheet-feeding port 24 selected at this time (Step S18 in FIG. 2A). In a case where there are a plurality of sheet-feeding ports 24 selected at this time, the controller 21 selects one and changes the one to the selected sheet-feeding port 24.

As a result, since the alternative sheet-feeding port 24 for insert-sheets has been decided, the controller 21 resumes the printing processing and terminates the process for when no insert-sheets are present.

On the other hand, in a case where in the result selected by the user operation, the sheet-feeding port 24 is not changed ("No" in Step S17 in FIG. 2A), the process proceeds to Step S20.

In Step S20, the controller 21 displays on the operation panel 23 and on the display device of the host computer 1 a message prompting replenishment of the insert-sheets (Step S20 in FIG. 2A). As a result, the process for when no insert-sheets are present ends, and the printing resumes when the insert-sheets are replenished, or the printing is canceled in a case where the user performs the cancel operation.

As described above, in the printer 2, the sheet-feeding port 24 for feeding regular paper or recycled paper is preferentially selected in selecting the alternative sheet-feeding port 24 for the insert-sheets. In addition, in a case where the print job performs printing processing on the OHP paper, the sheet-feeding port 24 for feeding the sheet having the same sheet size as the OHP paper is preferentially selected, and in a case where such a sheet-feeding port 24 is not present, the sheet-feeding port 24 for feeding the sheet having a sheet size larger than that of the OHP paper is selected. In addition, in a case where the print job does not perform printing processing on the OHP paper, the sheet-feeding port 24 for feeding the sheet with a sheet size and a sheet-feeding direction matching the sheet size and the sheet-feeding direction of paper used in the print job is preferentially selected, and in a case where such a sheet-feeding port 24 is not present, the sheet-feeding port 24 for feeding the sheet with a sheet size matching the sheet size of the sheet used in the print job is selected. In addition, in a case where insert-sheets are colored paper, the sheet-feeding port 24 for feeding the colored paper is preferentially selected.

Figure 3:
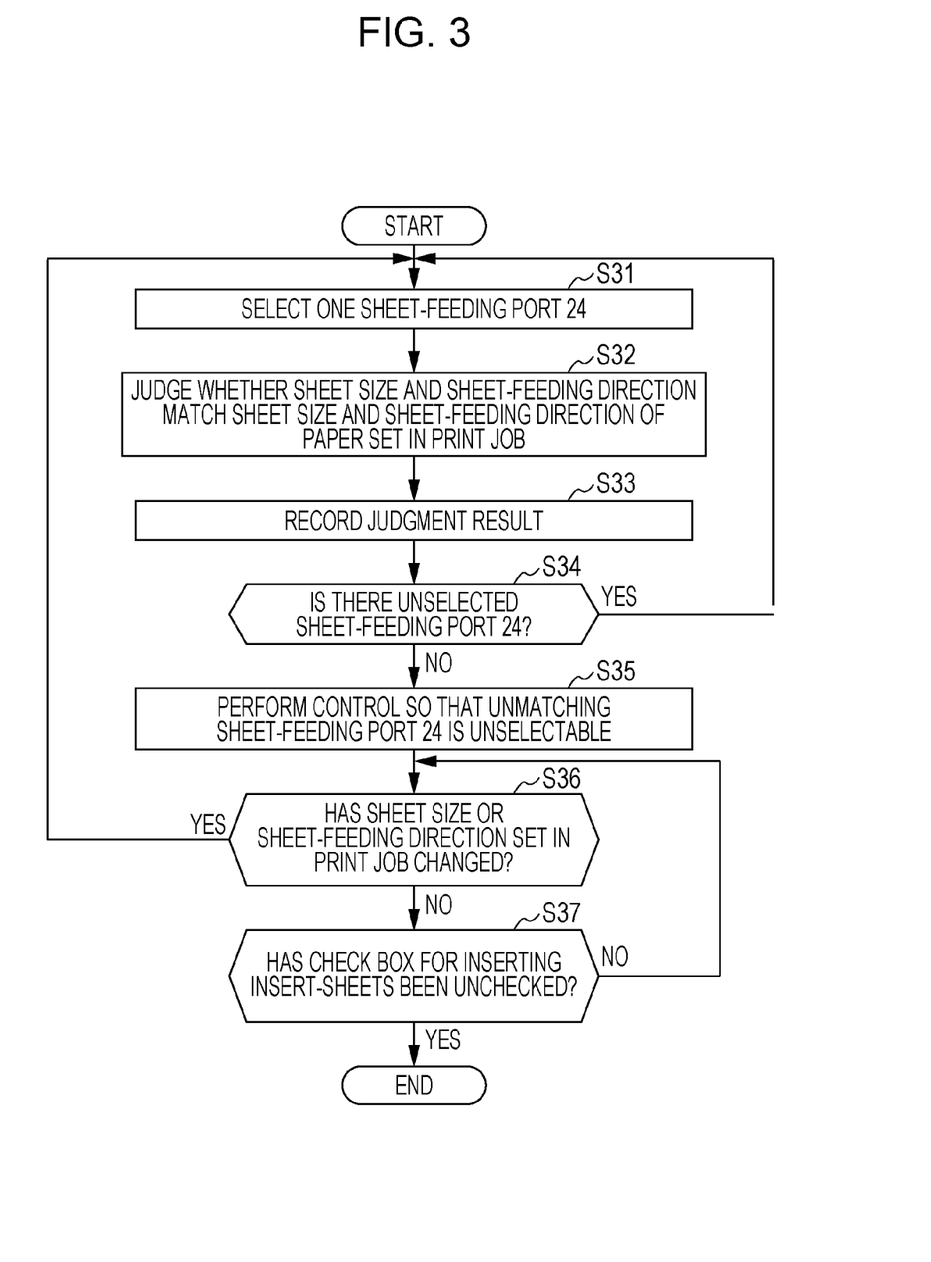
FIG. 3 is a flowchart illustrating steps of display control of a setting screen for insert-sheets.
Figure 4:
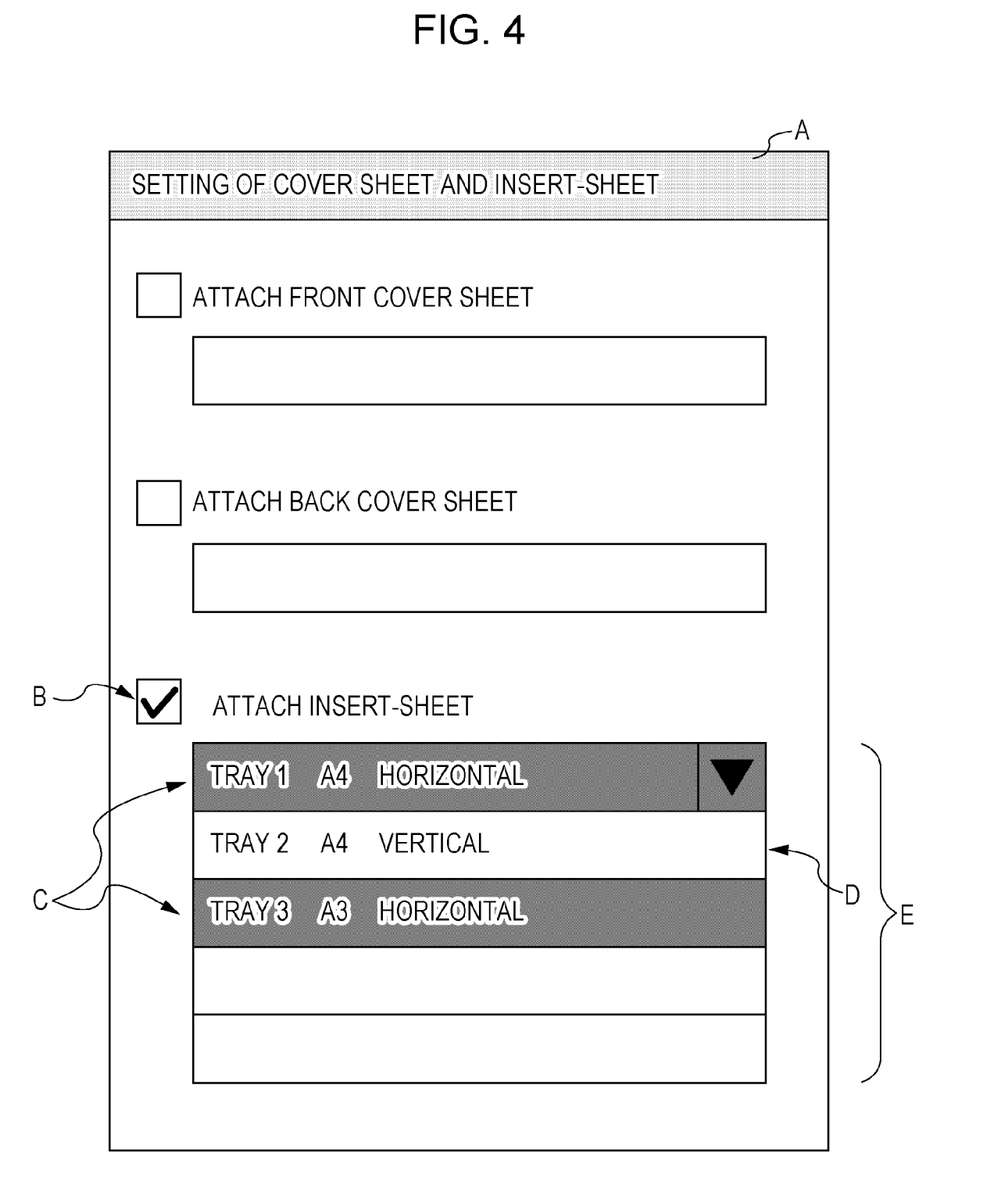
FIG. 4 is a diagram illustrating an example of the setting screen for insert-sheets.

Next, the process for when the user performs the setting operation on the insert-sheets will be described. FIG. 3 is a flowchart illustrating steps of display control of a setting screen for insert-sheets. FIG. 4 is a diagram illustrating an example of the setting screen for the insert-sheets.

In a case where the user configures settings for the insert-sheets at the time of a print request, the setting is performed using the insert-sheet setting screen ("A" in FIG. 4) which is displayed on the display device of the host computer 1 or on the display monitor of the operation panel 23 of the printer 2. On this screen, when the user performs a checking operation in the check box stating "Attach insert-sheet" ("B" in FIG. 4) in order to perform printing with insert-sheets inserted, the driver unit 11 of the host computer 1 or the controller 21 of the printer 2 executes the process in FIG. 3.

First, the driver unit 11 or the controller 21 selects one of the sheet-feeding ports 24 of the printer 2 (Step S31 in FIG. 3) and judges whether the sheet size and the sheet-feeding direction of paper fed from the one of the sheet-feeding ports 24 of the printer 2 match the sheet size and the sheet-feeding direction of paper set for the print job (Step S32 in FIG. 3).

Thereafter, the driver unit 11 or the controller 21 records the judgment result in a RAM or the like (Step S33 in FIG. 3).

The driver unit 11 or the controller 21 performs processes of the above selection (Step S31), judgment (Step S32), and recording (Step S33) for all sheet-feeding ports 24 ("No" in Step S34 in FIG. 3). On the basis of the record of the judgment result, the driver unit 11 or the controller 21 performs control such that the user cannot select a sheet-feeding port 24 where the sheet size and the sheet-feeding direction of paper fed from the sheet-feeding port 24 do not match the sheet size and the sheet-feeding direction of paper set for the print job (Step S35 in FIG. 3). On the setting screen, the driver unit 11 or the controller 21 changes the display to indicate that such sheet-feeding ports 24 cannot be selected. In the example illustrated in FIG. 4, in the pull-down menu ("E" in FIG. 4) from which a sheet-feeding port 24 for insert-sheets (tray in FIG. 4) is selected, the sheet size and the sheet-feeding direction of paper fed from, for example, trays indicated by "C" do not match the sheet size and the sheet-feeding direction of paper set for the print job, and the trays are displayed in a grayed-out state. Note that the sheet size and the sheet-feeding direction of paper fed from the tray indicated by "D" match the sheet size and the sheet-feeding direction of paper set for the print job, so that it is possible to select the tray indicated by "D".

Thereafter, in a case where the sheet size or the sheet-feeding direction of paper set for the print job is changed ("Yes" in Step S36 in FIG. 3), the driver unit 11 or the controller 21 executes the process starting from Step S31 again to control the selection by the user in a way similar to the above.

When the check box for inserting insert-sheets (the check box stating "Attach insert-sheet" ("B" in FIG. 4)) is unchecked ("Yes" in Step S37 in FIG. 3), the selection control process at the time of setting for the insert-sheets ends.

Note that the following process may be executed as an alternative process at the time of setting for the insert-sheets. In a case where selection control as described above is not performed, when the sheet size of paper fed from a sheet-feeding port 24 for insert-sheets selected by the user is different from a sheet size set for the print job, the driver unit 11 or the controller 21 changes the sheet-feeding port 24 for insert-sheets to another sheet-feeding port 24 for feeding the sheet with a sheet size matching the sheet size of paper set for the print job.

In addition, similarly, in a case where the sheet-feeding direction of paper fed from a sheet-feeding port 24 for insert-sheets selected by the user is different from the sheet-feeding direction of paper set for the print job, the driver unit 11 or the controller 21 changes the sheet-feeding port 24 for insert-sheets to another sheet-feeding port 24 for feeding the sheet with a sheet-feeding direction matching the sheet-feeding direction of paper set for the print job.

In addition, as another method, in a case where selection control as described above is not performed, when a sheet size of paper fed from the sheet-feeding port 24 for insert-sheets selected by the user is different from a sheet size of paper set for the print job, the driver unit 11 or the controller 21 displays a message stating such a difference to the user.

In addition, similarly, in a case where selection control as described above is not performed, when the sheet-feeding direction of paper fed from the sheet-feeding port 24 for insert-sheets selected by the user is different from the sheet-feeding direction of paper set for the print job, the driver unit 11 or the controller 21 displays a message stating such a difference to the user.

In addition, as another method, in a case where the sheet-feeding port setting in the print job is "sheet-feeding-port automatic selection" and a paper specification of paper set for the print job and a paper specification set for the insert-sheets do not match, the driver unit 11 or the controller 21 changes a paper specification of paper set for the print job to another paper specification matching the paper specification set for the insert-sheets among paper specifications of paper fed from the sheet-feeding ports 24 to be selected when the sheet-feeding port setting is "sheet-feeding-port automatic selection".

Note that a modified example as an embodiment may be provided where in the flowcharts illustrated in FIGS. 2A and 2B, the processing does not include part of the determination Steps (S3, S4, S5, S8, S9, S12, S17), which are conditional branches.

As described above, in the printer 2 according to the embodiment of the invention and the modified example, in a case where no insert-sheets are present during the printing process of inserting insert-sheets, an alternative sheet-feeding port 24 for insert-sheets is selected on the basis of the paper specification of paper set for the print job and the paper specification set for insert-sheets. As a result, printing can be continued with appropriate insert-sheets, and user-friendliness can be improved.

Further, in selecting the alternative sheet-feeding port 24, in a case where a sheet-feeding port for insert-sheets is set to "sheet-feeding-port automatic selection", the controller 21 preferentially selects a sheet-feeding port 24 for feeding paper with a sheet size which is identical to the sheet size of the insert-sheets of the sheet-feeding port where no insert-sheets are present among sheet-feeding ports 24 to be selected when the sheet-feeding port for insert-sheets is set to "sheet-feeding-port automatic selection". As a result, alternative paper feeding which meets user needs can be performed.

In addition, in selecting the alternative sheet-feeding port 24, a sheet-feeding port 24 for feeding the sheet with a sheet size matching the sheet size of the insert-sheets is preferentially selected among sheet-feeding ports 24 for feeding regular paper or recycled paper. As a result, alternative paper feeding without problems can be performed.

Further, in this case, the sheet-feeding port 24 for feeding the sheet with a sheet-feeding direction matching the sheet-feeding direction of the insert-sheets is preferentially selected. As a result, the alternative paper feeding having less problems than the above alternative sheet feeding can be performed.

In addition, in selecting the alternative sheet-feeding port 24, in a case where the insert-sheets are colored paper, the sheet-feeding port 24 for feeding the colored paper is preferentially selected. As a result, alternative paper feeding which meets user needs can be performed.

In addition, in a case where the print job performs printing processing on the OHP paper, the sheet-feeding port 24 for feeding regular paper or recycled paper is preferentially selected. This makes it possible to suppress sticking between sheets of OHP paper with the inexpensive insert-sheets and to improve user-friendliness by using alternative paper feeding, which meets user needs.

In addition, in a case where the print job performs printing processing on the OHP paper, the sheet-feeding port 24 for feeding paper with a sheet size matching the sheet size of paper used in the print job is preferentially selected, and in a case where such a sheet-feeding port 24 is not present, the sheet-feeding port 24 for feeding paper with a sheet size larger than the sheet size of paper used in the print job is preferentially selected. Therefore, even in a case where the alternative paper feeding is performed, the size of the insert-sheets is not smaller than that of the OHP paper, such that sticking between the sheets of OHP paper can be suppressed with certainty.

In addition, in a case where the print job performs printing processing on the OHP paper, control of alternative paper feeding is changed from control when other paper is used. As a result, appropriate alternative paper feeding suitable for the features of the OHP paper is performed, and user-friendliness can be improved.

In addition, when the user configures insert-sheet settings, the driver unit 11 or the controller 21 controls the setting of the sheet-feeding port 24 for insert-sheets on the basis of the paper specification of paper set for the print job. This makes it possible to avoid in advance printing using the insert-sheets which does not match paper set for the print job, and user-friendliness can be improved.

Specifically, on the screen for setting for insert-sheets, control is performed so that the sheet-feeding port 24 for feeding the sheet with a sheet size or a sheet-feeding direction which does not match the sheet size or the sheet-feeding direction of the sheet set for the print job can not be selected. Thus, it is possible to suppress the user from setting for the insert-sheets that are unsuitable for the print job.

Alternatively, in a case where the sheet-feeding port 24 for feeding the sheet with a sheet size or a sheet-feeding direction which does not match the sheet size or the sheet-feeding direction of paper set for the print job has been selected, a message stating that there is no matching is displayed to the user. The message prompts correction of the improper insert-sheet setting in advance.

In the embodiment of the invention, an example in which the CPU (processor) executes each process has been described.

Here, in this specification, the CPU may be constituted by one or a plurality of CPUs, or may be constituted by one or a plurality of integrated circuits (for example, an ASIC). In addition, the CPU may be constituted by a combination of one or a plurality of CPUs and one or a plurality of integrated circuits.

The scope of the invention is not limited to the foregoing embodiments and includes the invention described in the claims and their equivalents.

The entire disclosure of Japanese Patent Application No. 2017-145196, filed Jul. 27, 2017 and Japanese Patent Application No. 2017-143297, filed Jul. 25, 2017 is expressly incorporated by reference herein.

What is claimed is:

1. A printing apparatus having a function of inserting insert-sheets, the printing apparatus comprising:
sheet-feeding ports, wherein in each one of the sheet-feeding ports can be inserted with a sheet cassette;
a printing mechanism configured to perform printing on paper fed from each sheet-feeding port; and
a controller configured to control the printing mechanism and to configure one of the sheet-feeding ports as a sheet-feeding port for insert-sheets only for a print job,
wherein the controller is configured to perform the following:
after receiving the print job, control the printing mechanism to start, on the basis of the print job, the printing on the paper and inserting the insert-sheets from the sheet-feeding port for insert-sheets only;

after starting the printing on the paper and the inserting the insert-sheets, suspend the printing on the paper and the inserting insert-sheets in a case it is detected that there are no insert-sheets in the sheet-feeding port for insert-sheets only; and automatically and preferentially select a new sheet-feeding port for insert-sheets only from the sheet-feeding ports on the basis of a paper specification of paper used for the print job to be printed and a sheet-feeding port setting.

2. The printing apparatus according to claim 1,
wherein each sheet-feeding port is set to correspond to a sheet size, and
wherein the controller preferentially selects, as the new sheet-feeding port for insert-sheets only, the sheet-feeding port corresponding to a sheet size of paper used for the print job to be printed.

3. The printing apparatus according to claim 1,
wherein the controller preferentially selects, as the new sheet-feeding port for insert-sheets only, the sheet-feeding port corresponding to a sheet size and a sheet-feeding direction of paper used for the print job to be printed.

4. The printing apparatus according to claim 1,
wherein, when the controller determines that the new sheet-feeding port for insert-sheets only is empty, the controller preferentially selects, from the other sheet-feeding ports for insert sheets only, another sheet-feeding port for insert-sheets only corresponding to the sheet size of paper used for the print job to be printed as a new sheet-feeding port for insert-sheets only.

5. The printing apparatus according to claim 1,
wherein each of the sheet-feeding ports is set to correspond to a paper property, and
wherein in a case where a paper property of insert-sheets associated with the sheet-feeding port for insert-sheets only is colored paper and the sheet-feeding port for insert-sheets only is empty, the controller preferentially selects, from the other sheet-feeding ports for insert-sheets only, another sheet-feeding port for insert-sheets only corresponding to the colored paper as the new sheet-feeding port for insert-sheets.

6. The printing apparatus according to claim 1,
wherein each of the sheet-feeding ports is set to correspond to information indicating whether each sheet-feeding port is a target for sheet-feeding-port automatic selection, and
wherein in a case where the sheet-feeding-port automatic selection is set in the print job, the controller preferentially selects, from the other sheet-feeding ports for insert-sheets only, a sheet-feeding port which is the target for the sheet-feeding-port automatic selection as the new sheet-feeding port for insert-sheets.

7. The printing apparatus according to claim 1,
wherein each of the sheet-feeding ports is set to correspond to a paper property, and wherein the controller preferentially selects, from the other sheet-feeding ports for insert-sheets only, a sheet-feeding port for insert-sheets only corresponding to regular paper or recycled paper as the new sheet-feeding port for insert-sheets only.

8. The printing apparatus according to claim 7,
wherein in a case where paper used for the print job to be printed is OHP paper, the controller preferentially selects, from the other sheet-feeding ports for insert sheets only, a sheet-feeding port for insert-sheets only corresponding to the regular paper or the recycled paper as the new sheet-feeding port for insert-sheets only.

9. The printing apparatus according to claim 1,
wherein each of the sheet-feeding ports is set to correspond to a sheet size, and
wherein in a case where paper used for the print job to be printed is OHP paper, the controller determines whether a sheet-feeding port for insert-sheets only corresponding to a sheet size of the OHP paper is present, and in a case where the controller determines that the corresponding sheet-feeding port is present, the controller preferentially selects, from the other sheet-feeding ports for insert-sheets only, the corresponding sheet-feeding port as the new sheet-feeding port for insert-sheets only, and in a case where the controller determines that the corresponding sheet-feeding port for insert-sheets only is not present, the controller determines whether a sheet-feeding port corresponding to a sheet size larger than the sheet size of the OHP paper is present, and in a case where the controller determines that the sheet-feeding port for insert-sheets only corresponding to the sheet size larger than the sheet size of the OHP paper is present, the controller preferentially selects, from the other sheet-feeding ports for insert-sheets only, the sheet-feeding port corresponding to the sheet size larger than the sheet size of the OHP paper as the new sheet-feeding port for insert-sheets for insert-sheets only.

10. The printing apparatus according to claim 1,
wherein in a case where paper used for the print job to be printed is OHP paper, the controller selects the new sheet-feeding port for insert-sheets only on the basis of a rule different from a rule for selecting the new sheet-feeding port for insert-sheets only when paper used for the print job to be printed is paper other than the OHP paper.

11. A printing control apparatus configured to control a printing apparatus including sheet-feeding ports and having a function of inserting insert-sheets,
wherein the printing control apparatus configures one of the sheet-feeding ports as a sheet-feeding port for insert-sheets only for a print job,
wherein the printing control apparatus controls selection of the sheet-feeding port for insert-sheets only on a print setting screen on a basis of a paper specification of paper used for the print job to be printed, the paper specification being set on the print setting screen corresponding to the printing apparatus,
wherein the printing control apparatus controls the printing apparatus to start, on the basis of the print job, the printing on the paper and the inserting the insert-sheets from the sheet-feeding port for insert-sheets only,
wherein the printing control apparatus displays a message stating that no insert-sheets are present in the sheet-feeding port for insert-sheets only, when the printing apparatus suspends the printing on the paper and the inserting insert-sheets in a case no insert-sheets are detected in the sheet-feeding port for insert-sheets only, after starting the printing on the paper and the inserting the insert-sheets,
wherein, after displaying the message stating that no insert-sheets are present in the sheet-feeding port for insert-sheets only, the printing control apparatus selects a new sheet-feeding port for insert-sheets only on the basis of the paper specification of paper used for the print job and a sheet-feeding port setting.

12. The printing control apparatus according to claim 11, wherein the printing control apparatus controls the selection of the sheet-feeding port for insert-sheets only on the print setting screen such that a sheet-feeding port for feeding paper with a sheet size set on the print setting screen, the sheet size being different from a sheet size of paper used for the print job to be printed, is not selected as the sheet-feeding port for insert-sheets only.

13. The printing control apparatus according to claim 11, wherein the printing control apparatus controls the selection of the sheet-feeding port for insert-sheets only on the print setting screen such that a sheet-feeding port for feeding paper with a sheet-feeding direction set on the print setting screen, the sheet-feeding direction being different from a sheet-feeding direction of paper used for the print job to be printed, is not selected as the sheet-feeding port for insert-sheets only.

14. The printing control apparatus according to claim 11, wherein in a case where a sheet size set on the print setting screen, the sheet size being a sheet size of paper used for the print job to be printed, is different from a sheet size of paper to be fed from the sheet-feeding port for insert-sheets only selected on the print setting screen, the printing control apparatus changes the sheet-feeding port for insert-sheets only to another sheet-feeding port for insert-sheets only with a sheet size set on the print setting screen, the sheet size matching a sheet size of paper used for the print job to be printed.

15. The printing control apparatus according to claim 11, wherein in a case where a sheet-feeding direction set on the print setting screen, the sheet-feeding direction being a sheet-feeding direction of paper used for the print job to be printed, is different from a sheet-feeding direction of paper to be fed from the sheet-feeding port for insert-sheets only selected on the print setting screen, the printing control apparatus changes the sheet-feeding port for insert-sheets only to another sheet-feeding port for insert-sheets only with a sheet size set on the print setting screen, the paper associated with the another sheet-feeding port for insert-sheets only having a sheet-feeding direction matching a sheet-feeding direction of paper used for the print job to be printed.

16. The printing control apparatus according to claim 11, wherein in a case where a sheet size set on the print setting screen, the sheet size being a sheet size of paper used for the print job to be printed, is different from a sheet size of paper to be fed from the sheet-feeding port for insert-sheets only, the printing control apparatus displays a message stating that the sheet size of paper used for the print job to be printed and the sheet size of insert-sheets to be fed from the selected sheet-feeding port for insert-sheets only do not match.

17. The printing control apparatus according to claim 11, wherein in a case where a sheet-feeding direction set on the print setting screen, the sheet-feeding direction being a sheet-feeding direction of paper used for the print job to be printed, is different from a sheet-feeding direction of insert-sheets to be fed from the sheet-feeding port for insert-sheets only, the printing control apparatus displays a message stating that the sheet-feeding direction of paper used for the print job to be printed and the sheet-feeding direction of the insert-sheets to be fed from the selected sheet-feeding port for insert-sheets only do not match.

18. The printing control apparatus according to claim 11, wherein in a case where a paper specification set on the print setting screen, the paper specification being a paper specification of paper used for the print job to be printed, is different from a paper specification of insert-sheets to be fed from the sheet-feeding port for insert-sheets only, the printing control apparatus determines whether the setting for the sheet-feeding port for insert-sheets only is sheet-feeding-port automatic selection, and in a case where the printing control apparatus determines that the setting for the sheet-feeding port for insert-sheets only is the sheet-feeding-port automatic selection, the printing control apparatus changes the paper specification of paper used for the print job to be printed to another paper specification matching the paper specification of the insert-sheets to be fed from the selected sheet-feeding port for insert-sheets only.

19. A control method for controlling a printing apparatus having a function of inserting insert-sheets, the printing apparatus including a sheet-feeding ports, and a printing mechanism configured to perform printing on paper fed from one of the sheet-feeding ports during a print job, the control method comprising:
configuring one of the sheet-feeding ports as a sheet-feeding port for insert-sheets only;
after receiving the print job, controlling the printing mechanism to start, on the basis of the print job, the printing on the paper and the inserting the insert-sheets from the sheet-feeding port for insert-sheets only;
after starting the printing on the paper and the inserting the insert-sheets, suspending the printing on the paper and the inserting insert-sheets in a case no insert-sheets are detected in the sheet-feeding port for insert-sheets only; and
after suspending the printing on the paper and inserting the insert-sheets, automatically and preferentially selecting a different sheet-feeding port for insert-sheets only on the basis of a paper specification of paper used for the print job to be printed and a sheet-feeding port setting.

* * * * *